No. 669,380. Patented Mar. 5, 1901.
T. A. BRYAN.
ACETYLENE GAS GENERATOR.
(Application filed June 5, 1900.)
(No Model.) 2 Sheets—Sheet 1.
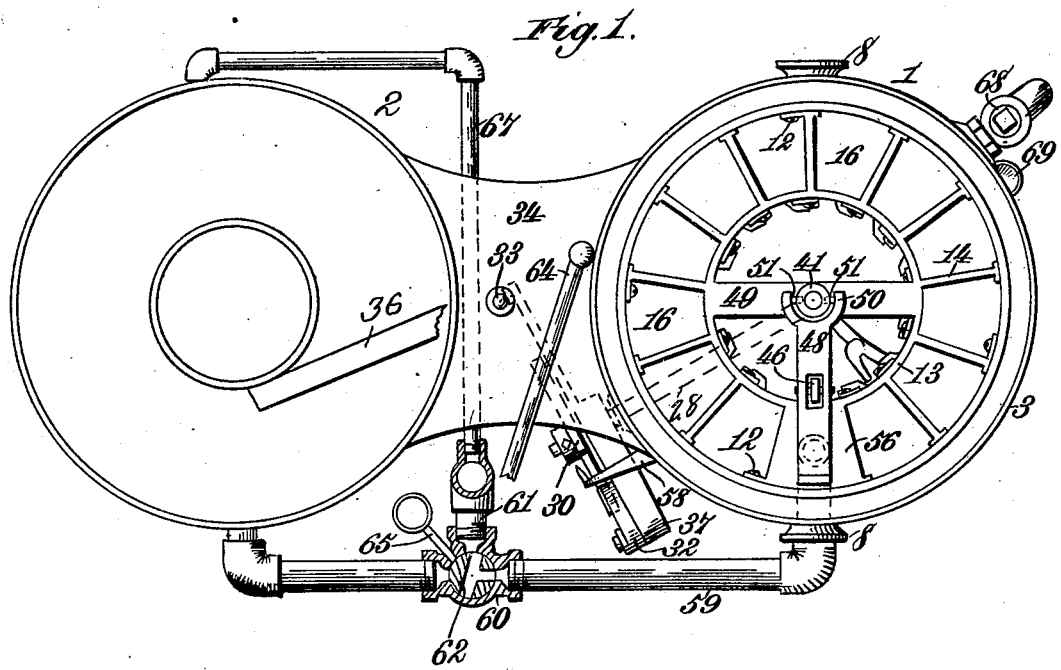
Witnesses: Robert Everett,
Inventor: Thomas A. Bryan,
By James L. Norris
Att'y No. 669,380. Patented Mar. 5, 1901.
T. A. BRYAN.
ACETYLENE GAS GENERATOR.
(Application filed June 5, 1900.)
(No Model.) 2 Sheets—Sheet 2.

Witnesses: Inventor:
Thomas A. Bryan,
By James L. Norris,
Atty.

UNITED STATES PATENT OFFICE.

THOMAS A. BRYAN, OF BALTIMORE, MARYLAND.

ACETYLENE-GAS GENERATOR.

SPECIFICATION forming part of Letters Patent No. 669,380, dated March 5, 1901.

Application filed June 5, 1900. Serial No. 19,159. (No model.)

*To all whom it may concern:*

Be it known that I, THOMAS A. BRYAN, a citizen of the United States, residing at Baltimore city, State of Maryland, have invented new and useful Improvements in Acetylene-Gas Generators, of which the following is a specification.

This invention relates to acetylene-gas generators, and has for its principal object to provide novel mechanism for successively discharging given quantities of carbid into the generating-chamber through the medium of parts operated by the rise and fall of the bell of a gasometer.

Further objects of the invention relate to certain novel features of construction, whereby I aim to provide an improved gas-generating apparatus which shall be positive and automatic in its operation, simple in construction, and of high efficiency in the production of acetylene gas.

To this end the invention resides in the parts and combinations of parts hereinafter described, and particularly designated in the claims, whereby the objects above indicated are attained.

The invention is illustrated in the accompanying drawings, wherein—

Figure 3:
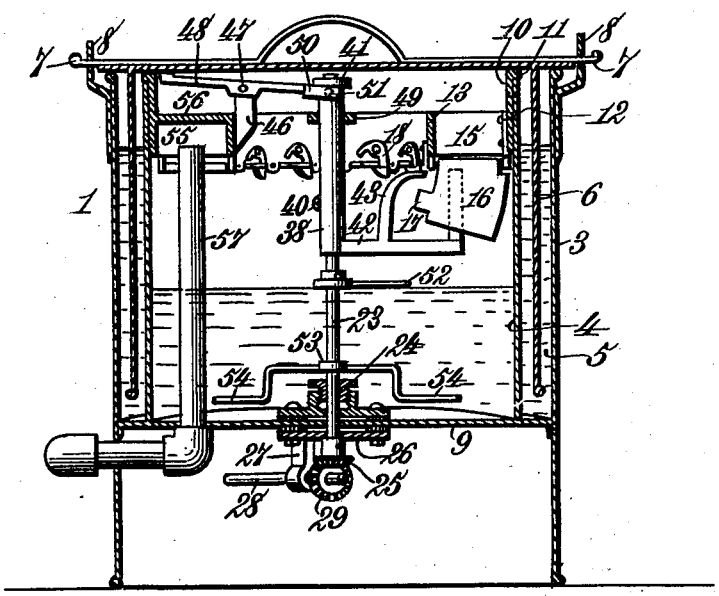
Figure 4:
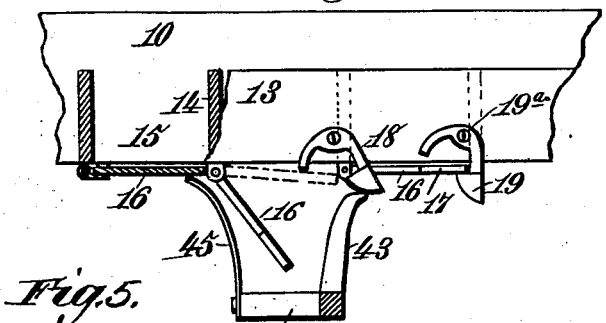
Figure 5:
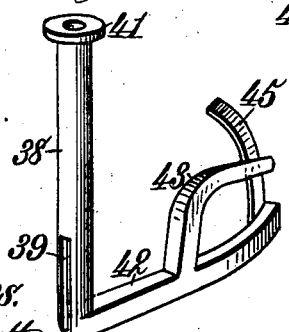
Figure 6:
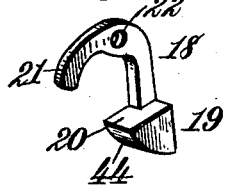

Figure 1 is a plan view of the complete apparatus, certain parts being in section and the cover of the generating-chamber being removed. Fig. 2 is a side elevation of the same. Fig. 3 is a similar elevation of the generator. Fig. 4 is an enlarged sectional view of a portion of the carbid-container. Fig. 5 is a detail view of the mechanism which is operated to successively open and close the compartments of the carbid-container, and Fig. 6 is a similar view of the latch for engaging the pivoted bottoms of the carbid-compartments.

The numeral 1 indicates the generator, and 2 the gasometer. The generator comprises an outer cylindrical casing 3 and an inner cylindrical casing 4, concentric with the outer casing, a space 5 being afforded between them, which is adapted to contain water to provide a water seal for the cover 6 of the generator, as usual. Said cover 6 is securely held in place by means of projections 7 at its top, which are adapted to be turned beneath suitable lugs 8, secured to the casing 3. The cylindrical casing 4 forms the generating-chamber proper, and a bottom 9 closes the lower portion of this chamber and of the chamber 5, affording a water seal. In the upper end of the casing 4 is located the carbid-container. Said container comprises an outer ring 10, which is of a circumference to fit snugly in the end of the casing 4 and is supported therein by means of an overhanging flange 11 and by suitable bolts or rivets 12, passing through the ring 10 and the casing 4, or in any other preferred manner, and an inner ring 13, having a series of radially-projecting arms or partitions 14, which at their outer ends are bolted to the ring 10. The rings 10 and 13 are of a suitable height to provide, in connection with the partitions 14, a series of carbid-compartments 15. The upper edge of the ring 13, which is in the same plane as the upper edges of the partitions 14, is located a considerable distance below the upper edge of the ring 10, for a purpose to be presently explained. Each of the compartments is closed by means of a bottom 16, pivotally mounted at one side thereof and having an inward projection 17, which is designed to be engaged by a latch 18, the latches 18 being pivotally secured at 19$^a$ above the bottoms of the compartments 15 to the inner side of the ring 13. As indicated in Fig. 6, each of these latches 18 is in the form of a bell-crank lever, the lower end whereof is provided with an enlargement or weight 19, affording a shoulder 20 for engaging beneath the projection 17 of the bottoms of the compartments and the upper end of which is curved downwardly to afford a finger 21, the purpose of which will presently appear. The latch 18 has in its upper part an aperture 22, whereby it may be pivotally secured to the ring 13, as before stated. By reason of the weight 19 the latch 18 will normally assume a perpendicular or upright position, so that the shoulder 20 will extend beneath the projection 17 of the bottoms 16. The mechanism for successively releasing these latches from engagement with the bottoms 16 will now be described.

Located centrally of the generating-chamber 4 and extending upward through the bottom thereof to near the top of the same is a shaft 23, a suitable stuffing-box 24 being provided around said shaft at the bottom of the chamber to prevent the leakage of the water in said chamber. On the lower end of the shaft 23 is secured a bevel-gear 25. Secured to the under side of the bottom 9 of the generating-chamber is a disk or plate 26, from which extend arms 27, in the lower ends of which is journaled a shaft 28, having a bevel gear-wheel 29 secured thereon, which meshes with the bevel-gear 25. Owing to the nature of the view only one of the arms 27 is shown in Fig. 3. It will be seen that the bottom 9 is located a considerable distance above the lower end of the outer casing 3, so that a space is provided beneath the generating-chamber for accommodating the parts last described. The shaft 28 extends through the wall of the casing 3 and on its outer end is provided with a ratchet-wheel 30, which is fast on said shaft. Pivotally mounted on the shaft 28, between the ratchet-wheel 30 and the casing 3, is an arm 31, having at one end a pawl 32 for engaging the teeth of the ratchet-wheel 30 and having pivotally secured at its other end a rod 33, which projects upward through and is guided by a plate 34, connected to the generator and the gasometer and located between the same, as shown. A sleeve 35 is preferably provided on the under side of this plate for more securely guiding the rod 33, said rod extending through said sleeve. On the bell of the gasometer is a projecting arm 36, which projects over the rod 33 and is adapted to engage the upper end thereof to depress said rod as the bell descends. By reference to Fig. 1 it will be seen that the end portion of the arm 31, containing the ratchet 32, is thicker, and consequently heavier, than the opposite end, such thickened portion being indicated by the numeral 37, so that as the bell rises this end of the arm will fall by gravity to move the ratchet 32 over the teeth of the ratchet-wheel 30 and at the same time elevate the rod 33. By the construction described the ratchet-wheel 30 will be revolved only in the downward movement of the bell, as will be understood. On the upper part of the shaft 23 is located the mechanism for positively engaging the latches 18, as shown in Fig. 3 and in detail in Fig. 5. This mechanism comprises a sleeve 38, which is adapted to be inserted on the shaft 23 and has at its lower end a slot 39, whereby by means of a screw 40, passed through said slot and screwed into the shaft 23, said sleeve is compelled to turn with the shaft 23, but is capable of vertical movement thereon. On the upper end of the sleeve 38 is an annular flange or collar 41, and projecting at right angles from its lower end is a relatively long arm 42. Intermediate its ends the arm 42 has projecting from its upper side a bent arm 43, which is so positioned that in the rotation of the sleeve 38 it will engage the under side of the weight 19, and thereby move the shoulder 20 of said weight from beneath the projection 17 of the bottom 16 and allow said bottom to drop. The weight 19 is suitably rounded on the side which is engaged by the bent arm 43 to permit said arm to readily pass out of engagement therewith, as will be understood and as indicated at 44. As the bell of the gasometer descends it depresses the rod 33, thereby, through the medium of the arm 31 and pawl 32, turning the ratchet-wheel 30, which in turn, through the medium of its shaft 28 and the bevel-gears 29 and 25, will turn the shaft 23, and thereby, as previously explained, cause the sleeve 38 to be turned or rotated with it. On the outer end of the arm 42 is a curved spring-arm 45, the curve of which carries it to the rear of the arm 43 relatively to the direction of rotation of said arm. Said arm 45 will be carried around by the sleeve 38 directly beneath the compartments 15. By this construction the bent arm 43 will first engage the latch 18 to release the bottom 16, and as said bottom falls it will strike against or be stopped by the spring-arm 45. This sudden shock or stop of the bottom 16 will assist in the discharge of the carbid therefrom. As the arm 42 is further carried around by the rotation of the sleeve 38 the spring-arm 45 will operate to raise the bottom 16, which has been previously released of its latch by the bent arm 43, again into engagement with its latch, which will first be pushed outward by the engagement of the edge of the bottom with its curved side 44 and then be moved by gravity beneath said bottom, as will be apparent. The purpose of the curved finger 21 of the latch 18 is to insure the fall of the bottom 16 when said latch has been released therefrom by positively engaging said bottom. This operation will be more clearly understood by referring to Fig. 4, wherein the bent arm 43 has turned the latch 18 out of engagement with the bottom 16 of one of the carbid-compartments and said bottom (shown by dotted lines) is about to fall, while in full lines I have shown the bottom as it is about to strike against the spring-arm 45. It will be seen that as the latch 18 is turned upon its pivot 19$^a$ by the bent arm 43 the end of the curved finger 21 will press against the bottom 16 immediately after the shoulder 20 has been moved from beneath the projection 17, which will operate to positively push the bottom 16 downward. This is a highly-important feature of my invention, for without some means for positively causing the bottoms 16 to drop they might be held or wedged by the carbid and be prevented from falling, and thus interfere with the uniform action of the apparatus.

It is essential or desirable that the bent arm 43 may be caused to occupy a position below the plane of the latches 18 when the cover 6 of the generator is removed, so that none of said latches may be accidentally released from engagement with the bottom 16 to discharge the carbid into the generating-chamber and so that on recharging the compartments 15 with carbid the arm 43 may be readily turned to a given or initial position without thereby engaging the said latches. To this end I provide the mechanism which will now be described.

The numeral 46 indicates a lug provided at one side of the ring 13 and projecting a short distance above the upper edge thereof. Pivotally secured at 47 on the outer end of this lug is a lever-arm 48. The shaft 23, with its surrounding sleeve 38, passes through a cross-bar 49, which extends diametrically across the ring 13 and is preferably cast integral with the same. This bar forms a guide for the sleeve 38, the collar 41 of said sleeve being located above said bar. On the inner end of the lever-arm 48 is a yoke 50, having inwardly-extending lugs 51, which engage beneath the under edge of the collar 41. When the cover 6 is secured in place on the generator its top engages the outer end of the lever-arm 48, and thereby lifts the yoke end of said lever and raises the sleeve 38, so that the bent arm 43 is in operative position, or, in other words, it is raised to such a height that it will engage the latches 18 as the sleeve 38 is turned by the shaft 23. When the cover is raised, the weight of the sleeve 38 and the parts connected thereto is such that said sleeve will fall, carrying the arm 43 downward, so that it will pass under the latches 18 without engaging them and raising the outer end of the lever-arm 48, so that said end will be again depressed when the cover is placed on the generator.

When the sleeve 38 is in its lowermost position, it may be turned by the shaft 23, so that the arm 43 may be brought to any desired position, and said arm will not engage the latches 18.

The numeral 52 indicates a pointer which is adjustably mounted on the shaft 23 by means of a screw or the like and is for the purpose of indicating the height to which the water should be supplied to the generating-chamber, as illustrated in Fig. 3.

Secured on the shaft 23, near its lower end, is a hub 53, projecting radially from which are a series of stirring-arms 54, which are located slightly above the bottom of the generating-chamber and are of such a length that they will clear the sides thereof and the exit-pipe 57, hereinafter described. The purpose of these stirring-arms is to prevent the slaked carbid from forming a compact mass at the bottom of the generating-chamber and forming, as it were, a blanket to prevent the free escape of the gas upward, while at the same time by agitating the mass of spent carbid they facilitate the free escape of any gas contained therein or access to any particles of carbid which may not have been reached by the water, so that I thereby secure the absolute decomposition of the entire body of carbid dropped into the generator and the free escape of all of the gas therefrom. It will be understood, of course, that the stirring-arms 54 are rotated as the shaft 23 turns.

One of the compartments 15 is formed as a dummy—that is, its top is closed and its bottom is left open. Such compartment is indicated at 55 and its cover or top at 56. The compartment 55 is adapted to receive the upper end of a pipe 57, which is for the purpose of conducting the gas from the generator to the gasometer. In practice on first starting the apparatus the sleeve 38 is turned to bring the bent arm 43 beneath the blank compartment 55, which may be regarded as the starting-point. The remaining compartments may be numbered consecutively from said compartment 55. A like series of numbers is provided on the ratchet-wheel 30 and by means of a pointer 58, secured to the casing of the generator and extending over said ratchet-wheel, it can be readily determined how many of the compartments have been emptied in the operation of the apparatus.

The pipe 57, leading from the generator, connects with a horizontal pipe 59, leading to the gasometer. Located intermediate the ends of the pipe 59 is a three-way valve-coupling 60. The pipe 59 extends into opposite sides of this coupling. Connected with the remaining coupling member is a pipe 61, which leads to the outer air. The valve 62 of this valve-coupling is operated by means of a rod 63, having a handle 64, which normally projects above the cover of the generating-chamber. When in this position, the valve 62 is turned so as to close communication between the pipe 59 and the pipe 61 and to afford communication between the generator and the gasometer. In order to remove the cover from the generator, the handle 64 must be first turned from above the same in the manner indicated in Fig. 1. This will turn the valve 62, so as to open communication between the pipe 59, leading from the generator, and the pipe 61, so that any gas in the generator can escape before the cover thereof is removed.

The numeral 65 indicates a small pipe leading through the casing of the coupling 60 and having a cup for containing oil. This will insure that the valve 62 will always be properly lubricated. Extending from the pipe 61 is a horizontal pipe 67, which leads into the gasometer and serves as the ordinary safety-pipe from the latter.

The numeral 68 indicates a blow-off cock leading from the bottom of the generating-chamber, by opening which the sediment in said chamber may be removed. The numeral 69 indicates the filling orifice or funnel for supplying water to the water seal of the generator.

The gasometer shown herein forms the subject-matter of a separate application for patent, filed June 5, 1900, Serial No. 19,160.

Having thus fully described my invention, what I claim as new, and desire to secure by Letters Patent of the United States, is—

1. In an acetylene-gas generator, the combination with a generating-chamber, of a carbid-container supported therein having a series of carbid-compartments provided with pivoted bottoms, means for holding said bottoms normally closed, means for automatically and successively releasing said bottoms, and detent mechanism operated thereby to engage and depress said bottoms, substantially as described.

2. In an acetylene-gas generator, the combination with a gasometer having a movable bell, of a generating-chamber, a carbid-container supported therein having a series of carbid-compartments provided with pivoted bottoms, means for holding said bottoms normally closed, mechanism operated by said bell for successively releasing said bottoms, and detent mechanism operated thereby to engage and depress said bottoms, substantially as described.

3. In an acetylene-gas generator, the combination with a generating-chamber, of a carbid-container supported therein having a series of carbid-compartments provided with pivoted bottoms, means for holding said bottoms normally closed, means for automatically and successively releasing said bottoms and again closing the same, and detent mechanism operated thereby simultaneously as the bottoms are released to engage and depress said bottoms, substantially as described.

4. In an acetylene-gas generator, the combination with a gasometer having a movable bell, of a generating-chamber, a carbid-container supported therein having a series of carbid-compartments provided with pivoted bottoms, means for holding said bottoms normally closed, mechanism operated by said bell for successively releasing said bottoms and again closing the same, and detent mechanism operated thereby simultaneously as the bottoms are released to engage and depress said bottoms, substantially as described.

5. In an acetylene-gas generator, the combination with a generating-chamber having a carbid-container supported therein provided with a series of carbid-compartments having pivoted bottoms, and with means for holding said bottoms normally closed, of vertically-movable and rotatable mechanism for successively releasing and depressing said bottoms, and means engaged by the cover of the generator to hold said mechanism in operative position and adapted to be released when said cover is removed to permit said mechanism to fall to an inoperative position, substantially as described.

6. In an acetylene-gas generator, the combination with a generating-chamber, of a carbid-container supported therein having a series of carbid-compartments provided with pivoted bottoms, a series of gravity-latches for engaging said bottoms, said latches having projections located above said bottoms, and means for successively releasing said latches from engagement with said bottoms and thereby causing said projections to engage the bottoms and depress the same, substantially as described.

7. In an acetylene-gas generator, the combination with a gasometer having a movable bell, of a generating-chamber, a carbid-container supported therein having a series of carbid-compartments provided with pivoted bottoms, a series of latches for engaging said bottoms, a shaft extending upward in said generating-chamber, a horizontal arm carried by said shaft, a bent arm projecting from said arm for engaging said latches to release the same from engagement with the bottoms, a spring-arm located at the end of said arm for receiving the impact of the falling bottoms, and means operated by said bell for rotating said shaft, whereby said bottoms will first be released by said bent arm to permit the discharge of the carbid and again be closed by said spring-arm, substantially as described.

8. In an acetylene-gas generator, the combination with a gasometer having a movable bell, of a generating-chamber, a carbid-container supported therein having a series of carbid-compartments provided with pivoted bottoms, a series of pivoted latches for engaging said bottoms and having projecting ends located above the same, a shaft extending upward in said generating-chamber, a horizontal arm carried by said shaft, an upright arm projecting from said horizontal arm and adapted to engage said latches, a spring-arm located at the end of said horizontal arm for receiving the impact of the falling bottoms, and means operated by the bell of the gasometer for rotating said shaft, whereby said upright arm will successively engage the latches to turn them from engagement with the bottoms, and thereby cause their projecting ends to bear upon the upper side of said bottoms and depress them, and said spring-arm will in the further movement of said horizontal arm again raise the bottoms into engagement with their latches, substantially as described.

9. In an acetylene-gas generator, the combination with a gasometer having a movable bell, of a generating-chamber, a carbid-container supported therein having a series of pivoted bottoms, a series of pivoted latches for engaging said bottoms, a shaft extending upward in said generating-chamber, a sleeve splined thereon, an arm carried by said sleeve for engaging said latches to successively release them from engagement with the bottoms, a lever pivotally mounted on the container and having said sleeve rotatably mounted and supported at one of its ends and having its opposite end normally engaged and held down by the cover of the generator, whereby when said cover is removed, the free end of said lever will be released and said sleeve will be permitted to fall to carry said arm beneath the plane of said latches, and means operated by said bell for revolving said shaft, substantially as described.

10. In an acetylene-gas generator, the combination with a gasometer having a movable bell, of a generating-chamber, a carbid-container supported therein having a series of carbid-compartments provided with pivoted bottoms, a series of pivoted latches for engaging said bottoms, a shaft extending upward in said generating-chamber, a sleeve splined on said shaft and having on its upper end a collar, an arm carried by said sleeve for engaging said latches to release them from engagement with the bottoms, a lever-arm pivotally mounted on said container and having at one end a yoke embracing said sleeve and provided with inwardly-extending lugs projecting beneath the said collar and having its opposite end normally engaged and pressed down by the cover of the generator, whereby when said cover is removed, the free end of said lever-arm will be released and said sleeve will be permitted to fall to carry its arm below the plane of said latches, and means operated by the bell of the gasometer for rotating said shaft, substantially as described.

In testimony whereof I have hereunto set my hand in presence of two subscribing witnesses.

THOMAS A. BRYAN.

Witnesses:
M. H. BARNEY,
CHARLES HUMPHREY BOONE.